United States Patent
Sutehall et al.

(10) Patent No.: US 11,300,751 B2
(45) Date of Patent: Apr. 12, 2022

(54) METHOD AND APPARATUS FOR INSTALLATION OF CABLES BY BLOWING AND USING AN UPSTREAM LUBRICATOR

(71) Applicant: Prysmian S.p.A, Milan (IT)

(72) Inventors: Ralph Sutehall, Milan (IT); Lee Anthony Spicer, Milan (IT); Russell Baker, Milan (IT)

(73) Assignee: Prysmian S.p.A., Milan (IT)

( * ) Notice: Subject to any disclaimer, the term of this patent is extended or adjusted under 35 U.S.C. 154(b) by 153 days.

(21) Appl. No.: 16/599,038

(22) Filed: Oct. 10, 2019

(65) Prior Publication Data

US 2020/0116969 A1    Apr. 16, 2020

(30) Foreign Application Priority Data

Oct. 11, 2018 (IT) .................. 102018000009367

(51) Int. Cl.
  *G02B 6/50* (2006.01)
(52) U.S. Cl.
  CPC ..................................... *G02B 6/50* (2013.01)
(58) Field of Classification Search
  CPC .......... G02B 6/50; G02B 6/52; G02B 6/4464; G02B 6/4438; G02B 6/10; H02G 1/086; H02G 1/00; H02G 3/00
  See application file for complete search history.

(56) References Cited

U.S. PATENT DOCUMENTS

| | | | | |
|---|---|---|---|---|
| 3,805,918 A * | 4/1974 | Altgelt | ................ | C10M 143/02 184/109 |
| 4,579,025 A * | 4/1986 | Fasolak | ................ | B23D 45/124 82/101 |
| 4,589,990 A * | 5/1986 | Zehler | ................ | C10M 169/04 508/481 |
| 4,601,840 A * | 7/1986 | Zehler | ................ | C10M 169/041 508/481 |
| 4,609,180 A * | 9/1986 | Fisher | ................ | H02G 1/08 254/134.3 FT |
| 4,932,746 A * | 6/1990 | Calzolari | ............. | G02B 6/4401 385/112 |
| 5,183,237 A * | 2/1993 | Drago | ................ | G02B 6/4464 254/134.4 |
| 5,434,944 A * | 7/1995 | Kerry | ................ | G02B 6/4452 385/135 |
| 5,756,149 A * | 5/1998 | Smith | ................ | B65H 54/70 242/477 |
| 5,937,970 A * | 8/1999 | Wates | ................ | F16N 7/34 184/55.2 |

(Continued)

OTHER PUBLICATIONS

EP Search Opinion for 19 201 032.0, undated, 1 page (Year: 2020).*

(Continued)

*Primary Examiner* — Andrew Jordan
(74) *Attorney, Agent, or Firm* — Seed IP Law Group LLP

(57) ABSTRACT

A method of installing a cable through a duct by blowing the cable with a stream of compressed air. The method comprises dispersing a nebulized lubricant in the stream of compressed air, causing the stream of compressed air to deposit the nebulized lubricant onto the cable and to blow it into the duct. An apparatus for carrying out the method is also disclosed.

7 Claims, 3 Drawing Sheets

(56) References Cited

U.S. PATENT DOCUMENTS

| | | | | |
|---|---|---|---|---|
| 6,019,351 A * | 2/2000 | Allen | ................... | G02B 6/4464 254/134.3 R |
| 6,040,003 A * | 3/2000 | Smith | ................... | B65H 54/70 242/477 |
| 6,051,315 A * | 4/2000 | Girgis | ................ | C03C 25/1065 428/36.3 |
| 6,170,804 B1 * | 1/2001 | Allen | ................... | G02B 6/4464 254/134.4 |
| 6,311,953 B1 * | 11/2001 | Lang | ................... | G02B 6/4464 254/134.3 R |
| 6,517,053 B1 * | 2/2003 | Griffioen | .............. | G02B 6/4464 254/134.3 R |
| 6,572,081 B2 * | 6/2003 | Griffioen | .............. | G02B 6/4464 226/97.1 |
| 6,631,884 B2 * | 10/2003 | Griffioen | .............. | G02B 6/4464 254/134.3 R |
| 6,641,331 B2 * | 11/2003 | Van Bijsterveld | ..... | G02B 6/504 254/134.3 R |
| 6,848,541 B2 * | 2/2005 | Griffioen | ................ | H02G 1/086 184/15.2 |
| 7,021,426 B2 * | 4/2006 | Griffioen | ................ | H02G 1/086 184/15.2 |
| 7,151,878 B2 * | 12/2006 | Sutehall | .............. | G02B 6/4464 385/100 |
| 7,431,963 B2 * | 10/2008 | Konstadinidis | ...... | G02B 6/4438 156/166 |
| 7,992,685 B2 * | 8/2011 | Griffioen | ................ | H02G 1/086 184/15.1 |
| 8,074,968 B2 * | 12/2011 | Cherix | ................ | G02B 6/4464 254/134.4 |
| 8,118,282 B2 * | 2/2012 | Griffioen | ................ | B65H 51/16 254/134.4 |
| 8,550,435 B2 * | 10/2013 | Gonen | ................ | G02B 6/4464 254/134.4 |
| 8,720,030 B2 * | 5/2014 | Barker | ................... | H02G 1/086 29/407.05 |
| 8,820,480 B2 * | 9/2014 | Sederl | ...................... | F16N 7/34 184/55.2 |
| 9,535,228 B2 * | 1/2017 | Barker | ................... | H02G 1/086 |
| 10,343,871 B2 * | 7/2019 | Parke | .................... | B65H 54/12 |
| 10,639,691 B1 * | 5/2020 | Jackson | ................ | B21C 99/00 |
| 2002/0139966 A1 * | 10/2002 | Griffioen | ................. | G02B 6/52 254/134.4 |
| 2003/0012606 A1 * | 1/2003 | Van Bijsterveld | ..... | G02B 6/504 405/184 |
| 2003/0146423 A1 * | 8/2003 | Griffioen | .............. | G02B 6/4464 254/134.4 |
| 2004/0007699 A1 * | 1/2004 | Griffioen | .............. | G02B 6/4464 254/134.4 |
| 2004/0042743 A1 * | 3/2004 | Konstadinidis | ...... | G02B 6/4438 385/100 |
| 2004/0096168 A1 * | 5/2004 | Wells | ................... | G02B 6/4432 385/113 |
| 2004/0156600 A1 * | 8/2004 | Sutehall | ............... | G02B 6/4464 385/100 |
| 2005/0067608 A1 * | 3/2005 | Griffioen | ................ | H02G 1/086 254/134.4 |
| 2006/0102430 A1 * | 5/2006 | Griffioen | ................ | H02G 1/086 184/15.1 |
| 2008/0135818 A1 * | 6/2008 | Griffioen | ................ | B65H 51/16 254/134.4 |
| 2009/0026429 A1 * | 1/2009 | Barker | ................... | H02G 1/086 254/134.4 |
| 2009/0236575 A1 * | 9/2009 | Cherix | ................. | G02B 6/4464 254/134.4 |
| 2010/0046895 A1 * | 2/2010 | Barker | ................. | G02B 6/4485 385/109 |
| 2010/0124394 A1 * | 5/2010 | Meek | ................... | G02B 6/3801 385/73 |
| 2010/0215328 A1 * | 8/2010 | Tatat | .................... | G02B 6/4495 385/113 |
| 2012/0023723 A1 * | 2/2012 | Barker | ................... | H02G 1/086 29/407.05 |
| 2012/0061186 A1 * | 3/2012 | Sederl | ...................... | F16N 7/34 184/55.2 |
| 2015/0288161 A1 * | 10/2015 | Allouche | ................ | E01C 23/09 405/180 |
| 2017/0341006 A1 * | 11/2017 | Boesner | ............. | B01D 39/1623 |
| 2020/0116969 A1 * | 4/2020 | Sutehall | ................. | H02G 1/086 |
| 2020/0310057 A1 * | 10/2020 | Risch | ................... | G02B 6/4486 |
| 2021/0001263 A1 * | 1/2021 | Boesner | ............. | B01D 39/1623 |

OTHER PUBLICATIONS

European Search Report for EP 19 20 1032, search completed Feb. 3, 2020, 1 page (Year: 2020).*

Reference number list for U.S. Patent Application Publication No. 2006/0102430 of Griffioen et al. (Griffioen) (Year: 2021).*

Reference number list for U.S. Patent Application Publication No. 2009/0236575 of Cherix Tatat et al. (Cherix) (Year: 2021).*

Reference number list for U.S. Pat. No. 20200116969 of Sutehall et al. (Sutehall, the present application) (Year: 2021).*

* cited by examiner

METHOD AND APPARATUS FOR INSTALLATION OF CABLES BY BLOWING AND USING AN UPSTREAM LUBRICATOR

BACKGROUND

Technical Field

The present disclosure generally relates to the field of deployment of cables, particularly cables for telecommunications and even more particularly optical cables, in ducts and conduits, including underground ducts and guide tubes that channelize the underground ducts. More specifically, the present disclosure relates to an improved method for installation of cables by blowing, and to a corresponding apparatus.

Description of the Related Art

When installing a fiber optic cable (hereafter also referred to as optical cable) in a duct, ease of installation and reduction in the amount of time needed to install the cable are two important concerns. Generally, it is desirable to install the longest continuous length of optical cable possible, in order to reduce the number of splices needed for the cable run. Splices are in fact time consuming to make, incur considerable installation costs, and each splice joint can cause a significant damping of the optical signal, thereby it is not desirable to have a large number of splice joints.

The installation of optical cables by pulling can be replaced by blowing with compressed air, possibly in combination with a synergetic pushing of the blown cables.

The cable installation with compressed air is generally named "blowing" when the cable is installed in an empty duct, and "overblowing" when the cable is installed in a duct already housing at least cable (generally referred to as "legacy cable"). Hereinafter, unless otherwise specified, the term "blowing" will be referred to "blowing" and "overblowing".

In cable installation using compressed air, the blowing efficiency (in term of maximum distance that a cable can be installed by blowing: the greater the maximum distance, the higher the blowing efficiency) can be improved by adding a wet lubricant to the duct or cable so as to reduce the coefficient of friction between the cable and the duct bore inner walls. The lubricant can be an aqueous emulsion of silicone.

At present, three ways of applying the lubricant are known.

A first way provides for pouring a quantity of lubricant into the duct where the cable is to be installed, and then blowing the poured lubricant through the route using a sponge propelled by compressed air. See, for example, W. Griffioen "Cable In Duct Installation: Lubrication Makes The Difference" IWCS 2012.

A second way, disclosed, for example, in US 2005/067608, provides for an in-line lubricator fitted onto the cable blowing head. Lubricant is smeared over the cable sheath prior to the cable entering the duct. In particular, US 2005/067608 discloses that a cable is installed in a protective duct or guide tube by means of blowing (and, optionally, synergetic pushing) and lubricating the cable during installation. Lubricating the cable is done after the cable exits from the cable blowing equipment and hence takes place in a pressurized airflow passage. A hollow chamber filled with foam-plugs saturated with lubricant forms the cable lubricator. Lubricant is wiped onto the cable as it moves through the pressurized lubrication compartment. A portion of the airflow used for propelling the cable during blowing installation is bypassed around the lubricator and injected into the duct trajectory downstream of the lubricator.

A third way, known by the Applicant from in-field experience, provides for injecting the lubricant into the compressed air at the 'Y' coupler and getting the lubricant blown along the sub-duct, thus lubricating the cable.

BRIEF SUMMARY

The Applicant has observed that known ways of applying lubricant for cable installation by blowing are not satisfactory.

Pouring a quantity of lubricant into the duct and then blowing the poured lubricant through the route using a sponge propelled by compressed air is not a very efficient method, because the efficiency of the lubrication is subject to changes in climatic conditions, and such a technique cannot be used in an overblowing installation due to the presence of a legacy cable. In particular, the Applicant has experimentally verified that when using a sponge and compressed air to distribute the lubricant, the level of silicone from the lubricant varies along the length of the duct route (see R. Sutehall et al., "Factors That Influence The Lubrication Of Mini-ducts & The Subsequent Installation Performance Of A Mini-Cable" IWCS 2016). This has a crucial effect on the installation of the cable as it has been verified that as the level of lubricant decrease, the level of push force to be applied to the cable in order to maintain the installation speed increases and eventually the cable installation will stop.

On the other hand, pouring lubricant into the sub-duct and making it distributed along the route by the compressed air also results in an uneven lubrication along the route and is especially difficult if the entry point for the lubricant is at the bottom of an incline which it can pour out of.

The Applicant has experienced that by injecting the lubricant into the compressed air at the 'Y' coupler and getting the lubricant blown along the sub-duct, the lubricant does not get transferred along the duct, particularly, the lubricant gets deposited inside the 'Y' coupler opposite the compressed air inlet.

Techniques such that disclosed in US 2005/067608 require costly and not easy to use equipment, and a blowing line modification.

The Applicant has observed that none of the known methods is satisfactorily applicable for blowing cables in mini-ducts (having an outer diameter of about 8-16 mm vs the sub-duct outer diameter of about 20-50 mm) and/or for long distance (up to 3,000 m for blowing and up to 1,200 m for overblowing), generally because the lubricant is poorly distributed.

In view of the above, the Applicant has conceived and reduced to practice new lubricating techniques applied to cable installation by blowing.

The Applicant has found improved methods for cable installation into ducts by blowing. The methods provide for dispersing a nebulized lubricant into the compressed air, which is then used to blow the cable into a duct. In this way, the cable to be installed by blowing is continuously lubricated as it passes through the compressed air containing the nebulized lubricant.

According to an aspect, the present disclosure relates to a method for installing a cable through a duct by blowing the cable with a stream of compressed air, the method comprising dispersing a nebulized lubricant in the stream of compressed air, and causing the stream of compressed air to deposit the nebulized lubricant onto the cable and to blow it through the duct.

In an embodiment, the duct where the cable is blown by the stream of compressed air with the nebulized lubricant dispersed therein already contains at least one further cable (or legacy cable).

In an embodiment, the method comprises providing an opening in the duct and blowing the cable into the duct through said opening.

In an embodiment, the nebulized lubricant is or comprises an aqueous emulsion of silicone.

According to another aspect, the present disclosure relates to an apparatus for the installation of a cable through a duct by blowing the cable with a stream of compressed air, the apparatus comprising a cable blowing head having a compressed air inlet for receiving the stream of compressed air, a cable inlet for receiving the cable to be installed and a cable outlet for delivering the cable blown by the stream of compressed air, characterized by comprising, upstream with respect to the compressed air inlet, a lubricator configured to disperse into the stream of compressed air a nebulized lubricant.

In an embodiment, the apparatus of the disclosure comprises a lubricator which is or comprises a micro-fog lubricator.

For the purpose of the present description and of the appended claims, as "nebulized lubricant" refers to a lubricant in form of mist or fog.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the disclosure.

The preceding summary is to provide an understanding of some aspects of the disclosure. As will be appreciated, other embodiments of the disclosure are possible utilizing, alone or in combination, one or more of the features set forth above or described in detail below.

BRIEF DESCRIPTION OF THE SEVERAL VIEWS OF THE DRAWINGS

These and other features and advantages of the method and apparatus according to the present disclosure will be made apparent by the following detailed description of embodiments thereof, provided merely by of non-limitative examples, which should be read by referring to the attached drawings for better intelligibility.

In the drawings.

DETAILED DESCRIPTION EXAMPLE

Figure 1:
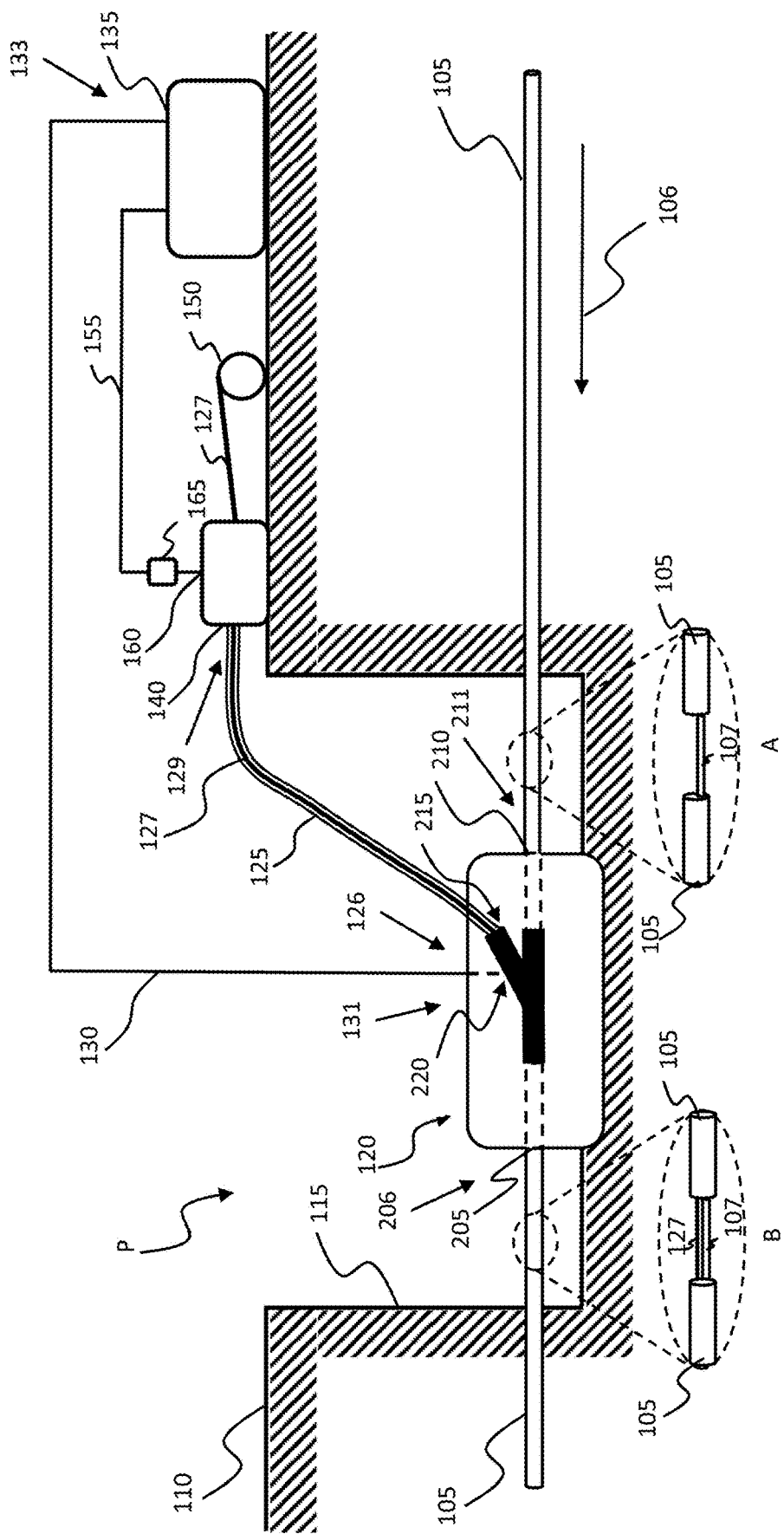
FIG. 1 schematically depicts an application scenario of using embodiments of the methods and apparatuses of the present disclosure.

Referring to FIG. 1, there is schematically depicted a scenario of use of an embodiment of the method and apparatus of the present disclosure.

A duct 105 for optical cables is assumed to be already deployed. In the considered example, the duct 105 is deployed underground, buried under the ground surface 110.

The duct 105 may contain one or more optical cables (thus the installation of a further or an additional cable is by overblowing), or may be empty (thus the installation of a cable is by blowing). In the considered example (as shown in the detail A in FIG. 1, where a part of duct 105 is shown with an exploded view), the duct 105 already contains an optical legacy cable 107, thus it is an example of installation by overblowing. For example, the duct 105 can be a duct of 20 mm of internal diameter, and the optical cable 107 can have a diameter of 13 mm.

An (additional) optical cable 127 is inserted into the duct 105 at a position P and run through the duct 105 along with the legacy cable 107 (as shown in the detail B in FIG. 1, where, similarly to detail A, a part of the duct 105 is shown with an exploded view). For example, the optical cable 127 to be inserted into the duct 105 can have a diameter smaller than that of the cable 107, e.g., a diameter of 5 mm.

In a hand-hole or manhole 115, a "Y" coupler 120 is installed. The "Y" coupler 120, also known as "Y" connector, is a device employed for increasing the number of fiber cables in a duct like duct 105.

Figure 2:
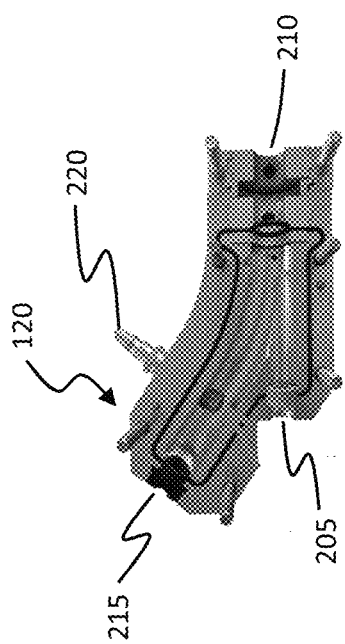
FIG. 2 depicts in greater detail a "Y" coupler used in the scenario of FIG. 1.

An example "Y" coupler 120 for blow cable installation is shown in FIG. 2. The "Y" coupler 120 has a duct inlet 205, a duct outlet 210, a cable inlet 215 and a compressed air inlet 220.

Referring back to FIG. 1, an end 206 of the section of the duct 105 downstream the manhole 115 where the "Y" coupler 120 is installed (i.e., on the left looking at FIG. 1) is inserted into the duct inlet 205. An end 211 of the section of the duct 105 upstream the manhole 115 is inserted into the duct outlet 210. An arrow 106 indicates the downstream direction. An end 126 of a duct (mini-duct) 125 containing the new cable 127 to be installed in the duct 105 enters the "Y" coupler 120 at the cable inlet 215. An end 131 (delivering outlet) of a hose 130 conveying compressed air is connected to the compressed air inlet 220 of the "Y" coupler 120.

The hose 130 has an opposite end 133 connected to a source of compressed air, for example a compressor 135.

The mini-duct 125 containing the new cable 127 to be installed has an end 129 opposite to the end 126 that is connected to cable inlet 215. The end 129 is connected to a cable blowing head (or launching unit or blowing apparatus) 140, e.g., set up close to the manhole 115. The blowing head 140 receives the new cable 127 to be blown into the duct 105 from a cable drum 150 where a supply of new optical cable is wound. A cable straightener can optionally be provided between the cable drum 150 and the blowing head 140 to straighten the cable 127 entering the blowing head 140. The blowing head 140 is fed with compressed air by the compressed air source, e.g., compressor 135 via a compressed air feed hose 155.

The blowing head 140 can be a combination pushing and blowing cable insertion equipment, of the type described for example in U.S. Pat. No. 4,850,569.

Along the compressed air feed hose 155, e.g., at or close to a compressed air inlet 160 of the blowing head 140, a lubricator (or lubricant feeding device) 165 is provided.

The lubricator 165 is a device configured to spray, nebulize or atomize a suitable lubricant so as to create a fog or mist of small airborne lubricant droplets that are injected into the stream of compressed air delivered through the hose 155. In this way, the compressed air used by the blowing head 140 to blow the cable 127 is loaded with tiny droplets of lubricant, which form a nebulized or fog of lubricant. When compressed air containing the fog of lubricant meets the cable 127, the cable 127 is lubricated by droplets of lubricant depositing onto the sheath of the cable 127.

Figure 3:
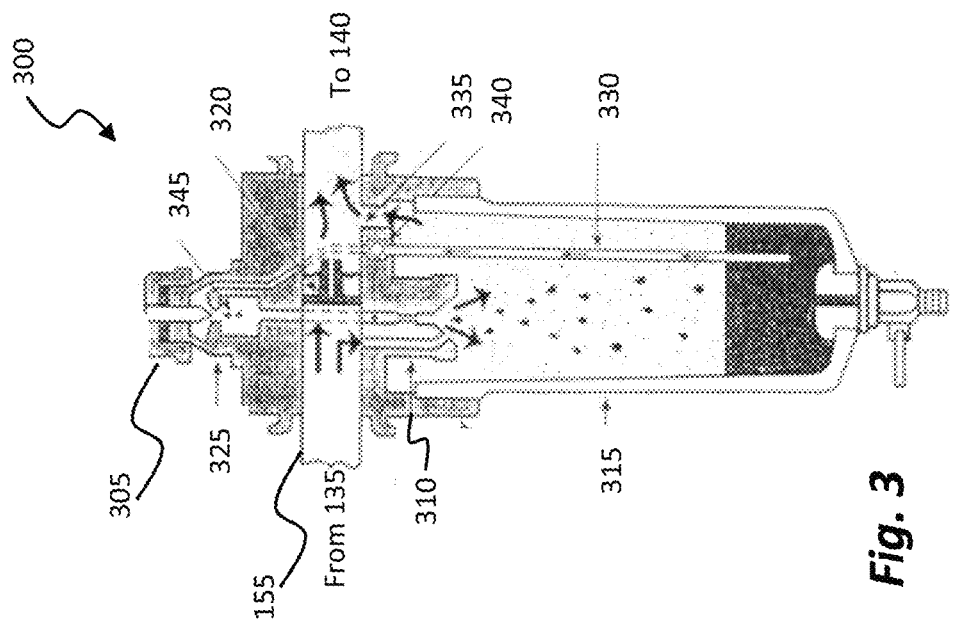
FIG. 3 depicts in cross-section a micro-fog lubricator which can be used in embodiments of the method and apparatus of the present disclosure, and FIG. 4 schematically depicts another application scenario of using embodiments of the methods and apparatuses of the present disclosure.

In an embodiment, the lubricator 165 can be a lubricating assembly that may include a reservoir holding a supply of a lubricant, for example in the liquid state, and a fog generator, as it will be shown in detail in FIG. 3. The lubricator 165 atomizes a liquid lubricant to create a fog or mist of small airborne lubricant droplets that are then dispersed in the compressed air flow.

Any lubricator suitable to atomize a liquid lubricant to fine particles can be used according to the present disclosure.

For example, in some embodiments, the lubricator 165 is or includes a fogger or a micro-fog lubricator. An example of a micro-fog lubricator is shown in FIG. 3, where it is globally designated as 300. In some embodiments, a micro-fog lubricator produces a fine mist or fog of oil (of micrometric size) and introduces this mist or fog into the system, which in this context is the flow of compressed air supplied to the blowing head 140. This mist or fog can travel long distances (up to about 15 meters) in piping, even with numerous bends and fittings before it reclassifies (i.e., before the droplets grows in dimension).

The micro-fog lubricator 300 injects a finely divided "fog" of lubricant into the flowing stream of compressed air supplied by the compressor 135 to the blowing head 140, so as to load the compressed air with nebulized lubricant. The density of the fog or mist is controlled by a drip rate adjusting knob 305: for example, counterclockwise rotation increases and clockwise rotation decreases the fog density.

The lubricant is metered into the air line only when there is a flow of air through the lubricator 165, 300. A small portion of the air flowing through the lubricator 165, 300 is diverted through the fog generator 310 into a reservoir 315. The major portion of the air passes around a flow sensor 320 to the downstream system (i.e., to the blowing head 140).

The high velocity air flowing through the fog generator 310 aspirates air from a sight-feed dome 325, creating a low-pressure area. Lubricant in the reservoir 315 is drawn upward through a siphon tube 330 into the sight-feed dome 325 where it drips into the fog generator 310. The adjusting knob 305 controls the drip rate. The lubricant drops are atomized by the high velocity air flow through the air jets in the fog generator 310, creating a high concentration of fine lubricant aerosols (fog) in the upper part of the reservoir 315.

The larger drops settle out into the reservoir 315. The smaller drops remain airborne and are carried through a passage 335 into the downstream air line 155 and then to the compressed air inlet 160 of the blowing head 140. A check ball 340 prevents loss of prime during periods of no flow.

The flow sensor 320 functions as a variable restriction in the lubricator's throat. It produces a pressure drop between inlet and outlet that is proportional to the air flow through the lubricator 165, 300. These variations in outlet pressure, sensed in the lubricator reservoir 315, cause a proportional change in the velocity of the air flowing through the venturi of the fog generator 310. The change in air velocity results in a proportional change in the amount of lubricant drawn across a metering orifice 345.

In an embodiment, a micro-fog lubricator like the example micro-fog lubricator 300 can be inserted in line along the compressed air feed line (like the hose 155).

Various lubricants are available from commercial sources and can be used for cable lubrication purposes. An aqueous emulsion of silicone is a suitable lubricant.

Using a micro-fog lubricator like the micro-fog lubricator 300, a lubrication rate of approximately 25 drops/minute ensures that the stream of compressed air is loaded with a sufficiently dense lubricant fog.

The method and apparatus of the present disclosure can be advantageously used for the overblown installation of a small (e.g., 5.0 mm) outer diameter cable into a sub-duct (e.g., of 20 mm internal diameter) that already contains a legacy cable (e.g., a cable of 13 mm of outer diameter). Installing a small outer diameter cable into a sub-duct that already contains a legacy cable has recently become of great interest to network providers. The main issue with this process is that the lack of lubrication on the legacy cable already installed in the sub-duct reduces the maximum installation distance. Up to now, in order to overcome this problem, a large quantity of lubricant is poured into the sub-duct in hopes that when the compressed air is introduced into the sub-duct the lubricant is distributed through the route, typically up to 700 m.

It is not possible to blow a sponge through the sub-duct containing the legacy cable, because the sponge can become trapped between the cable and sub-duct in correspondence of bends.

The method and apparatus of the present disclosure offer a cost-effective approach, by injecting lubricant into the compressed air stream prior to the blowing head. The lubricant, in the form of a mist or fog, lubricates the cable sheath within the blowing head and as it passes along the moving cable within the mini-duct.

Figure 4:
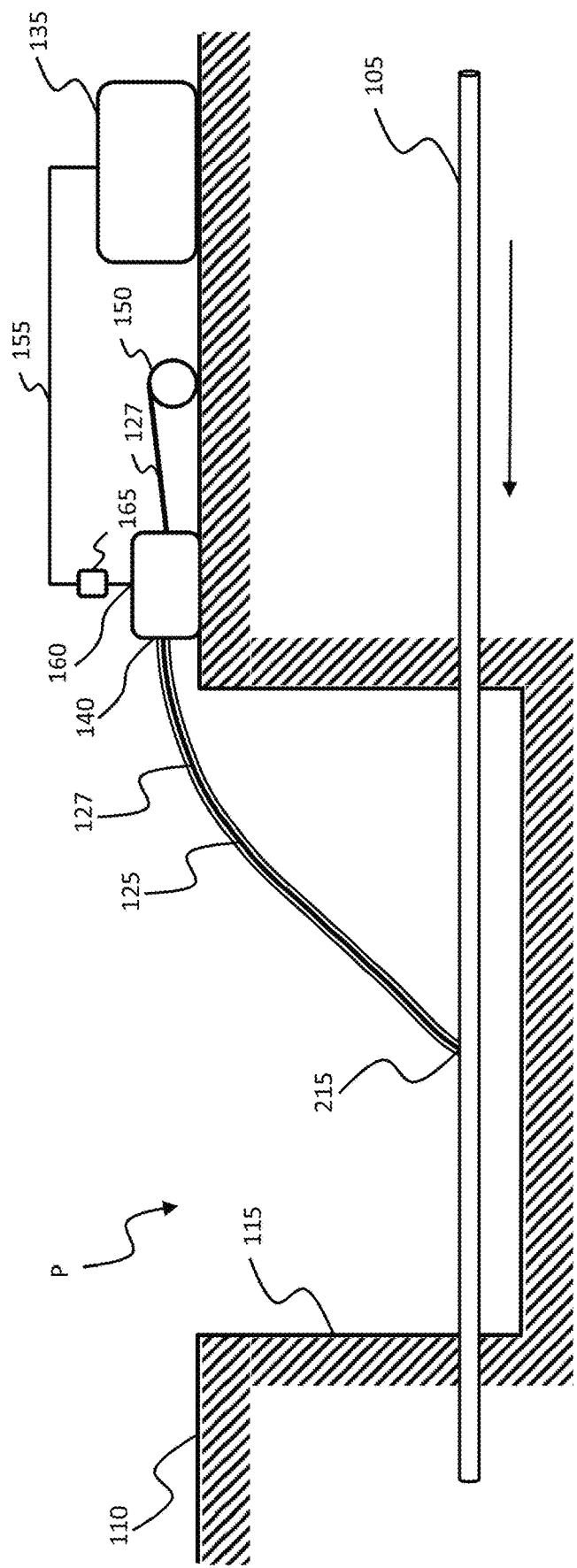

The method and apparatus of the present disclosure can also be used for conventional blown cable installation where a cable is installed into an empty duct (sub-duct or mini-duct), or, alternatively, an optical cable contained in a mini-duct is directly buried, as depicted in FIG. 4. In this installation, no Y coupler 120 is present and no hose 130 is provided, while the cable 127 is blown into the duct (e.g., mini-duct) 125 directly by the blowing head 140.

The method and apparatus of the present disclosure is applicable for blowing cables in mini-ducts (having an outer diameter of about 8-16 mm vs the sub-duct outer diameter of about 20-50 mm) and/or for long distance (up to 3,000 m for blowing and up to 1,200 m for overblowing).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of installing a cable through a duct, the method comprising:

dispersing, using a lubricator, a nebulized lubricant into a stream of compressed air; and blowing, using a cable blowing head, the cable into the duct with the stream of compressed air containing the nebulized lubricant, the blowing causing the stream of compressed air to deposit the nebulized lubricant onto the cable, wherein the cable blowing head includes a compressed air inlet that receives the stream of compressed air and a cable inlet that receives the cable, the cable inlet separate from the compressed air inlet; and wherein the lubricator is arranged upstream with respect to the compressed air inlet.

2. The method of claim 1, wherein the duct already contains at least one further cable.

3. The method of claim 1, further comprising providing an opening in the duct and blowing the cable into the duct through said opening.

4. The method of claim 1, wherein the lubricant is or includes an aqueous emulsion of silicone.

5. An apparatus for installing a cable into a duct by blowing the cable with a stream of compressed air, the apparatus comprising:

a cable blowing head having a compressed air inlet for receiving the stream of compressed air, a cable inlet separate from the compressed air inlet and for receiving the cable to be installed and a cable outlet for delivering the cable blown by the stream of compressed air; and upstream with respect to the compressed air inlet, a lubricator configured to disperse into the stream of compressed air a nebulized lubricant substance.

6. The apparatus of claim 5, wherein the lubricator includes a fogger.

7. The apparatus of claim 5, wherein the lubricator is a micro-fog lubricator.

* * * * *